US012657301B2

(12) United States Patent
Shemer et al.

(10) Patent No.: US 12,657,301 B2
(45) Date of Patent: Jun. 16, 2026

(54) SYSTEM AND METHOD FOR EARLY NOTIFICATION OF CYBER VAULT DATA INTEGRITY SCANNER COMPROMISE

(71) Applicant: Dell Products L.P., Round Rock, TX (US)

(72) Inventors: Jehuda Shemer, Kfar Saba (IL); Girish Balvantrai Doshi, Pune (IN)

(73) Assignee: Dell Products L.P., Round Rock, TX (US)

( * ) Notice: Subject to any disclaimer, the term of this patent is extended or adjusted under 35 U.S.C. 154(b) by 440 days.

(21) Appl. No.: 18/331,840

(22) Filed: Jun. 8, 2023

(65) Prior Publication Data

US 2024/0411884 A1 Dec. 12, 2024

(51) Int. Cl.
*H04L 9/40* (2022.01)
*G06F 21/56* (2013.01)
*G06F 21/64* (2013.01)

(52) U.S. Cl.
CPC ............ *G06F 21/568* (2013.01); *G06F 21/64* (2013.01); *H04L 63/1433* (2013.01)

(58) Field of Classification Search
CPC ..... G06F 21/568; G06F 21/64; H04L 63/1433
See application file for complete search history.

(56) References Cited

U.S. PATENT DOCUMENTS

| | | | | |
|---|---|---|---|---|
| 11,829,486 | B1 * | 11/2023 | Lambotte | ................. G06N 3/09 |
| 2020/0280576 | A1 * | 9/2020 | Key | ........................ H04L 63/20 |
| 2023/0156032 | A1 * | 5/2023 | Andriani | ................. H04L 63/20 |
| | | | | 726/22 |
| 2023/0327885 | A1 * | 10/2023 | Griffin | .................. G06F 21/602 |
| | | | | 713/164 |

FOREIGN PATENT DOCUMENTS

| | | | | |
|---|---|---|---|---|
| CN | 111866004 | A | * 10/2020 | ........... G06F 16/353 |
| JP | 4860856 | B2 | * 1/2012 | ......... H04L 63/1425 |
| JP | 2019191670 | A | * 10/2019 | |

* cited by examiner

*Primary Examiner* — Trong H Nguyen
(74) *Attorney, Agent, or Firm* — Workman Nydegger

(57) ABSTRACT

One example method includes providing infected data to a vault as part of a simulated attack, when no report is received, at an expected time, concerning the infected data in the vault, raising an alarm indicating that a data integrity scanner of the vault is not functioning properly, when a report is received from the vault concerning the infected data, checking the report to determine if the report is valid, when the report received from the vault is determined not to be valid, raising an alarm indicating that the data integrity scanner is not functioning properly, and when the report received from the vault is determined to be valid, generating an indication that the data integrity scanner is functioning properly.

20 Claims, 3 Drawing Sheets

300

Memory — 302

NVM — 304

Processor — 306

Storage Media — 308

UI Device — 310

Application(s) — 314

Data Storage — 312

SYSTEM AND METHOD FOR EARLY NOTIFICATION OF CYBER VAULT DATA INTEGRITY SCANNER COMPROMISE

FIELD OF THE INVENTION

Embodiments of the present invention generally relate to data integrity. More particularly, at least some embodiments of the invention relate to systems, hardware, software, computer-readable media, and methods, for identifying anomalous behavior in a data scanner such as may be employed in a vault.

BACKGROUND

Data vault systems may provide safety from data attacks leveraging technologies such as an air gap, and immutability support from storage systems. However, these vault systems are not immune from operational attacks that can impact the functioning of one or more of its subsystems, such as a data integrity scanner sub-system.

In more detail, data vaults, such as the Dell PowerProtect Cyber Recovery (CR) data vault for example, may take the form of an air-gapped system that is network isolated from the external world for most of the time except when data must be moved into, or restored from, the vault. The data copies in the vault are later scanned, in the vault, as part of an anomaly detection process to determine whether a particular copy of data in the vault is a clean, or compromised, copy.

To ensure the integrity of the vault and the data, the time window when the air gap is closed for data transfer is meant to be, and is kept, as short as possible. However short the time window is however, there is nonetheless an opportunity for the attacker to penetrate the vault and cause havoc when the air gap is closed. Such disruption may take various forms including, but not limited to, one or more of the following: [1] data copies in the vault are compromised; [2] vault subsystems are affected and cannot function as expected— particularly, a DIS (data integrity scanner) in the value is affected, so no scanning can be performed, and/or an air gap management component is affected, so air gaps cannot be opened or closed as desired.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
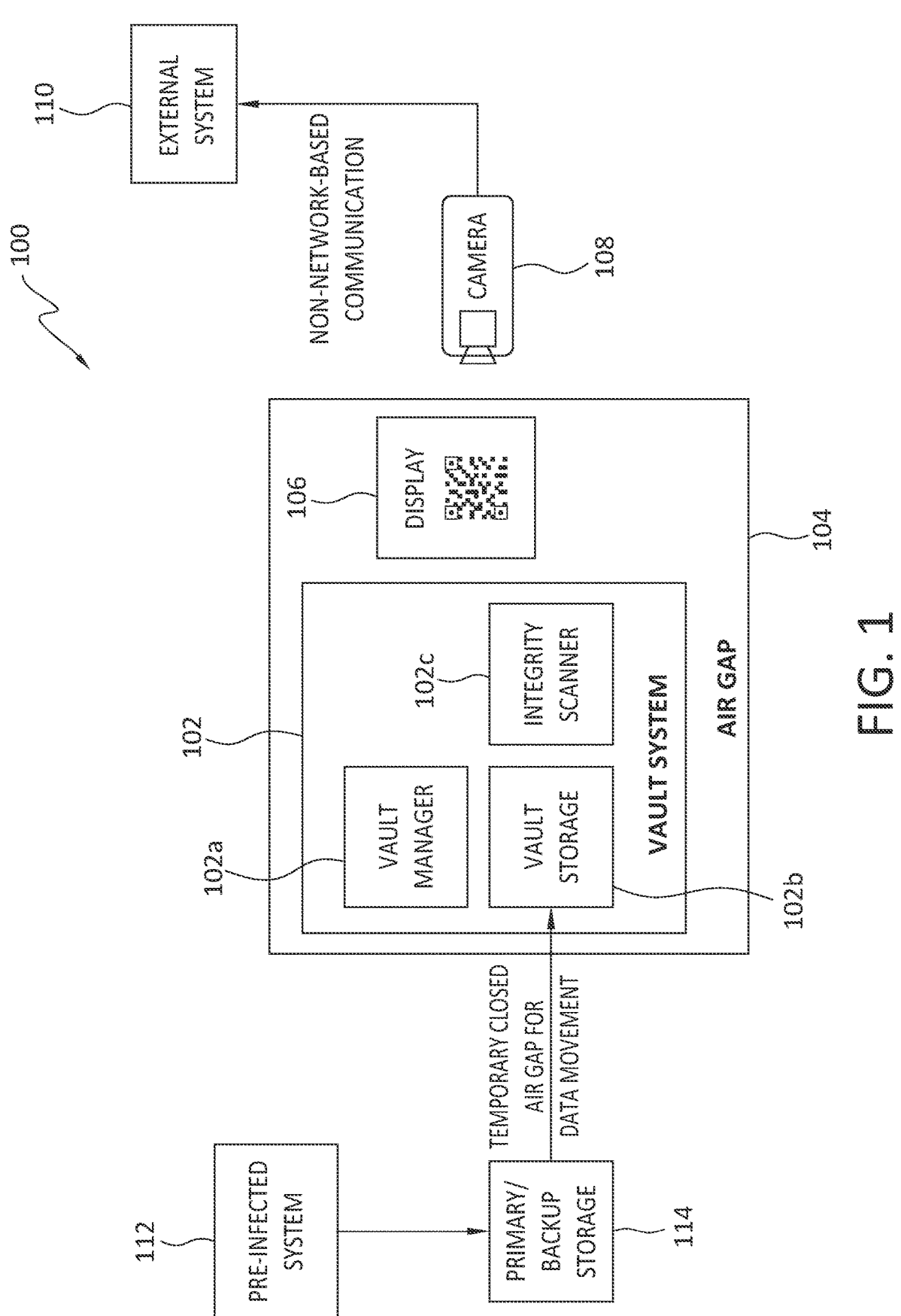
FIG. 1 discloses aspects of an architecture according to one example embodiment.

Embodiments of the present invention generally relate to data integrity. More particularly, at least some embodiments of the invention relate to systems, hardware, software, computer-readable media, and methods, for identifying anomalous behavior in a data scanner such as may be employed in a vault.

In one example embodiment, a simulated cyber attack may be performed that comprises sending compromised data to a vault, possibly according to some regular cadence. The compromised data may be tagged for identification. Subsequently, as part of normal operations, a DIS in the vault may scan the compromised data and flag that data as being infected, and the DIS may also provide information about the nature of the particular infection, which may comprise any type(s) of malware, involved. The information generated by the DIS may be reported to an external management system, such as by way of a non-network mechanism or channel. Based on this information from the DIS, the external management system may determine that the DIS is running, and that the compromised data has been correctly identified as such.

On the other hand, when the vault system is attacked and the DIS is compromised, then either no, or false, status is communicated back to the external management system at a scheduled time. In this case, the infected data may be safely deleted, and the user may not be notified that an infection occurred. Further, the external management system may raise an alarm and generate a notification if the external management system does not receive a status from the vault, regarding the pre-infected data copy, at the scheduled time, or if the external management system receives a false mismatch status about the infected copy, or incorrect random challenge.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that a controlled attack may be used to test the operation and effectiveness of a DIS. An embodiment may provide for identification and deletion of compromised data in a manner that is transparent to a user. An embodiment may provide for notification by an air gapped vault, of a compromised DIS without requiring the use of a network mechanism to connect to the vault. Various other advantages of some example embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of Some Example Operating Environments

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention may provide for the implementation of the disclosed functionality in platforms such as, but not limited to, the Dell PowerProtect Cyber Recovery (CR) platform, as well as in data backup platforms, examples of which include the Dell-EMC Net-Worker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a data-center which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include data storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally, however, the scope of the invention is not limited to the employment of any particular type or implementation of a cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Context, and General Aspects of an Example Embodiment

One or more example embodiments are concerned with circumstances that include the compromising of a DIS, also referred to herein simply as a 'scanner,' such that the DIS is not performing data scanning. In this regard, a DIS compromise may take various different forms. For example, a scanner may be disabled, or brought down, so that it no longer operates to scan data. As another example, a scanner may be replaced, by a bad actor, with a fake scanner that does not perform data scans, and does not report any data compromises that a scanner would ordinarily be expected to report. Either of these circumstances may induce a false sense of safety in the user, who may incorrectly assume that since no problems are being reported, no problems exist.

The following example scenarios are illustrative: [1] on a typical day in a normal uncompromised environment, that is, where there is no attack on the data or the vault where the data is stored, the scanner will scan the data copies but will not find any copies impacted, and the scanner will then report accordingly; [2] there is an attack in which the data is impacted, but there is no negative impact on the vault system or the scanner-in this scenario, the scanner will scan the data in the vault to identify the compromised data, and then report those copies of the data that are infected; [3] the data copy in the vault, the vault system, and the scanner, are all compromised-in this scenario, the scanner will not perform any scanning, and therefore will fail to report any impacted data, and may simply report that no problems have been identified.

Note that a user, such as an admin for example, does not have enough information to be able to distinguish between scenario [1] and scenario [3], that is, the user cannot determine which scenario is present. Particularly, in both cases, a report may indicate that there is no compromised data. In scenario [3] however, an attack has occurred that impacts the operation of the scanner. Thus, the vault in this example is vulnerable to an operational attack that can render its data integrity scanning subsystem paralyzed long before the attack is noticed.

In view of this context, an example embodiment of the invention may provide early notification of a DIS compromise by inducing pre-infected data copies at a regular cadence that the system must report. Failing to report, by the DIS, these infected data copies may cause the transmission of a notification indicating potential compromise of the DIS. In this way, an embodiment of the invention may usefully distinguish scenario [1] from scenario [3], discussed above, and timely report the compromise that has taken, or is taking, place that has affected, or is affecting, the data, vault, and scanner.

In more detail, an example embodiment of the invention may comprise an approach to provide detection and notification of DIS compromises. In an embodiment, a data system may be intentionally infected with one or more types of malware, thus simulating the effects of a cyber-attack. This intentional infection of the client 112 data may be performed on a regular, though not necessarily fixed, cadence. In an embodiment, this infection resulting from the simulated attack, along with the nature of the impact of the infection on the data, will be flagged and reported as an impacted copy by the DIS so long as the DIS has not been compromised. As long as the DIS has not been compromised, the simulated attack, and consequent reporting by the DIS, may take place on a regular basis, such as daily for example.

In an embodiment, the simulated attack may comprise a special attack that may be identified as such by a management system so that, under normal operating conditions, the management system will not mistakenly alert the end user to the attack, but may instead log that DIS verification has passed. In a case when the DIS is compromised by a real attack, either no scan is performed because DIS is down, or a fake DIS scan is performed that fails to report any data compromise.

C. Example Architecture

Directing attention now to FIG. 1, an architecture according to one example embodiment is denoted generally at 100. The example architecture 100 may include vault system 102, such as the Dell PowerProtect Cyber Recovery data vault for example, although other vault systems may alternatively be used. The vault system 102 may comprise, for example, a vault manager 102a, vault storage 102b that may store backups or copies of data, and an integrity scanner 102c operable to scan the stored data to identify any compromised data, malware, or other problems.

The vault system 102 may be selectively isolatable from the outside world by an air gap 104. In general, the air gap 104 may comprise a physical air gap. In general, the nature of the air gap 104 is such that when the air gap 104 is in place, that is, the air gap 104 is open, there is no physical, or other, connection between the vault system 102 and any external systems or components, thus ensuring the security and integrity of any data stored in the vault system 102. In an embodiment, security procedures may be implemented that provide for selective closing of the air gap 104, for a limited time, so that the vault 102 can communicate with external systems such as for the reception, and transmission, of data, as discussed in more detail below. In at least some instances, the vault system 102 may control the opening and closing of the air gap 104.

The example architecture 100 may also comprise a display unit 106 configured to display still images and/or video. For example, the display unit 106 may be able to present a visual image that can be detected by a camera 108, which may be connected to an external management system 110. Thus, the display unit 106 may enable the vault system 102 to convey information, such as in the form of a displayed image, to the camera 108 without requiring the air gap 104 to be closed. In an embodiment, the display unit 106 may comprise an element of the vault system 102 and, as such, the display unit 106 may be isolated from the outside world by the air gap 104.

A client 112, such as a Linux® or Windows® machine for example, may comprise data, such as files for example, that may be backed up at a regular cadence. Backups of this data may be stored in storage 114 which may comprise primary and/or backup storage. The air gap 104 may be closed from time to time to enable backups in the storage 114 to be moved, or copied, to the vault system 102.

D. Operational Aspects of an Example Embodiment

With reference to the example architecture 100 disclosed in FIG. 1, further details are now provided concerning various operational aspects of an example embodiment. These details are provided by way of example and are not intended to limit the scope of the invention in any way.

D.1 Operations of an Intentionally Infected System

In an embodiment, the client 112 may comprise data that is backed up at a regular cadence, although that is not necessarily required. A ransomware tool, or other malware tool, may be used to infect the data on the client 112. This intentional infection may be implemented in various ways, that is, there are multiple ways in which ransomware, or other malware, may infect data. In an embodiment, data of the client 112 may be infected in a different way, and/or using a different malware tool, during each backup cycle so as to avoid predictability. As well, in an embodiment, multiple clients 112 and/or other systems may be deployed and protected at different cadences, or may be deployed automatically to induce even more diversity in the infected data that is created.

At times, there may be a real attack affecting other computing systems in the environment where the client(s) 112 operate. To differentiate the simulated attack being carried out from the real attack, and to prevent ransomware, or other malware, from piggybacking on the infection test, a backup of the client 112 data may be tagged in a way that identifies the particular induced infection for that particular backup. In an embodiment, a challenge-response mechanism may be employed using a tag that may comprise a signed/encrypted random number, or hash, that is not repeated between tests but which can be detected and validated by the external management system 110. In an embodiment, this mechanism may help to prevent replay attacks by a bad actor.

After the client 112 data has been intentionally infected by the simulated attack, backups of the infected data of the client 112 may be performed, possibly according to some regular cadence, such as one or more times per day, for example. The backups with the infected data may be stored in the storage 114. At the same, or a different, cadence as the backups are created and stored, the backups may be moved from the storage 114 to the vault system 102.

D.2 Vault System Operations

At some point after the intentionally infected data is stored in the vault system 102, the integrity scanner 102c may scan the infected data and flag the copy of that data as 'INFECTED.' The integrity scanner 102c may also provide information about the particular nature of the infection such as, for example, whether the infected data has particular traits indicative of a specific type of malware, such as ransomware for example. If the integrity scanner 102c has not been compromised, this information should correspond with the infection that was introduced into the client 112 for that particular copy of data. In an embodiment, this information obtained by the integrity scanner 102c about the infected copy, and the nature of the infection, may be communicated from the vault 102 to the external management system 110 outside of the air gap 104 by way of a standard reporting method of the external management system 110, or through non-network-based mechanisms, an example of which is discussed below.

D.3 Communications Between a Vault System and Management System

One example of a non-network-based communication system, such as for enabling communications between the vault system 102 and the external management system 110, may employ a display unit 106, as discussed earlier herein. In one particular embodiment, the display unit 106 of the vault system 102 may be operable to display the information, generated or obtained by the integrity scanner 102c, about the infected data copy, along with other information such as the data and time that the infection was identified by the integrity scanner 102c.

In an embodiment, the information about the infected data copy may be displayed, by the display unit 106, in the form of a cryptographically signed visual code, such as a QR code for example. The outside system has a camera that reads this QR code. Thus, communication of status from the vault system 102c to the external management system 110 can be implemented without requiring physical access or closing the air gap 104 between the vault system 102c and the external management system 110.

D.4 External Management System Operations

In an embodiment, the external management system 110 may receive information, such as the status of the integrity scanner 102c, from the vault system 102. The external management system 110 may accordingly be able to determine that [1] the data integrity scanner 102c is up and running, and [2] whether or not the data integrity scanner 102c has correctly marked the data copy as infected or not. The status information and other information passed from the data integrity scanner 102c may also comprise information indicating the nature of the infection found by the data integrity scanner 102c in the infected data stored in the vault system 102. This information may then be validated, by the external management system 110, against the type of infection that was induced in that copy of the data, and a random number challenge, as discussed earlier, may be used by the external management system 110 to ascertain whether or not the data integrity scanner 102c is operating normally.

D.5 Operations Relating to a Real Attack

In the event that the vault system 102 is attacked by a bad actor, and the data integrity scanner 102c is compromised as a result of the attack, then either [1] no status information is transmitted by the data integrity scanner 102c—this may occur when the data integrity scanner is disabled by the attack, or [2] false status information is generated by the data integrity scanner 102c communicated back at a scheduled time to the external management system 110—this may occur when the data integrity scanner is compromised, but not disabled, by the attack. Note that in a case where the data has been infected by a real attack, the infected data may be safely deleted, and the owner of the data may not be notified that an infection occurred.

In the event that the external management system 110 has determined that a real attack has occurred, because no/incorrect information was received by the external management system 110 from the data integrity scanner 102c, the external management system may, in either case, raise an alarm and send a notification. For example, the alarm/notification may be implemented if the external management system 110 does not receive any status from the vault system 102, at the designated time about the pre-infected data cop, or if the data management system 110 received false/mismatched status about the infected copy or if the data integrity scanner 102c fails to respond correctly to a random challenge of a challenge and response process. Thus, in an embodiment, the external management system 110 may provide real-time, or near real-time, notifications about attacks without having to physically access the vault system 102 to learn about the attack and its impact.

The notifications and alarms generated by the external management system 110 may be of any suitable type. For example, notifications may be sent by email, webhook, or SMS (short message system). Example alarms include, but are not limited to, a bell, siren, or flashing light.

E. Further Discussion

As apparent from this disclosure, example embodiments may possess various useful features and advantages. For example, an embodiment may comprise and employ a pre-infected data system for detection of a compromised data integrity scanner in a vault. As another example, an embodiment may randomize a pre-infection to avoid predictability. An embodiment may tag each pre-infected copy of data with the nature of infection induced, that is verified with the nature of infection reported for that copy. An embodiment may and an encrypted/signed random number to prevent replay attacks. An embodiment may provide a data integrity scanner compromise notification without requiring closure of an air gap protecting the vault system where the data integrity scanner runs. Finally, an embodiment may provide real-time notification of compromised data/data integrity scanner without the need to physically access the vault to learn about the attack.

F. Example Methods

Figure 2:
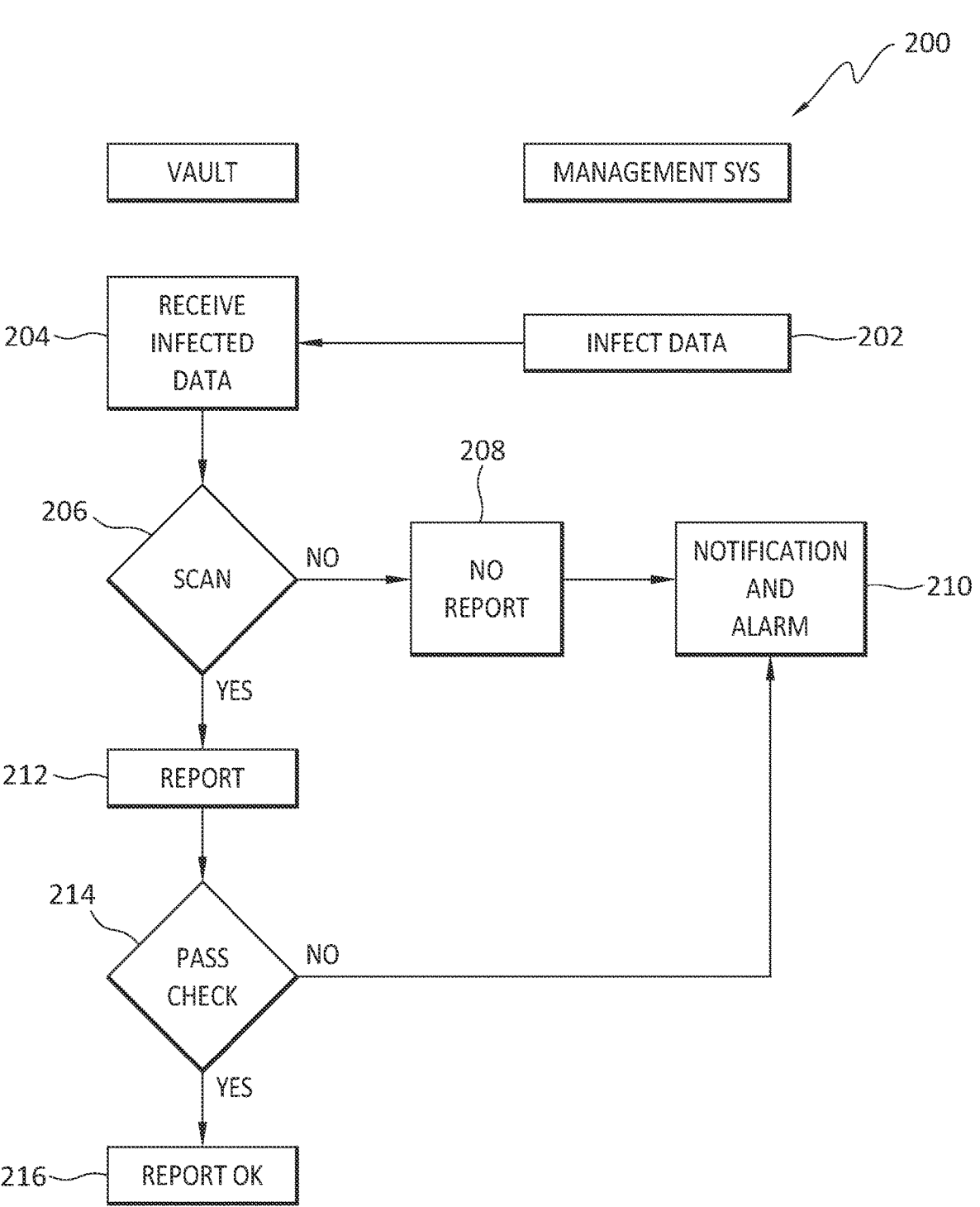
FIG. 2 discloses aspects of a method according to one example embodiment.

It is noted with respect to the disclosed methods, including the example method of FIG. 2, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, a method according to one example embodiment is denoted generally at 200. In an embodiment, the method 200 may be cooperatively performed by a vault system, and an external management system.

The example method 200 may begin with the intentional infection of data 202 as part of a simulated attack to check the operation of a data integrity scanner of a vault system. The data thus infected may be stored 204 in the vault system. In a case where a real attack has already taken place, the data integrity scanner of the vault system may have been disabled by the attack and, as a result, may not perform any scan 206 of the infected data. In this example, since the data integrity scanner has been disabled, the data integrity scanner may likewise fail 208 to send a report, because it is unable, to the external management system at the expected time. As a result, the external management system may then send a notification and raise an alarm 210.

In the case of either a simulated attack, or when an actual attack has occurred that has compromised or corrupted data in the vault system but has not disabled the data integrity scanner, the data integrity scanner may scan 206 the compromised data. After the scan has been completed, the data integrity scanner may send a report 212 to the external management system.

At this point, a check may be performed to determine if the report that was sent 212 provides the expected response, such as may be determined by a challenge and response mechanism. If the response does not pass the check 214, then the external management system may send a notification and raise an alarm 210. On the other hand, if the response passes the check 214, such as may occur when the data integrity scanner is operating correctly and is responding to a simulated attack, then the report may be logged as correct 216.

G. Further Example Embodiments

Following are some further example embodiments of the invention. These are presented only by way of example and are not intended to limit the scope of the invention in any way.

Embodiment 1. A method, comprising: providing infected data to a vault as part of a simulated attack; when no report is received, at an expected time, concerning the infected data in the vault, raising an alarm indicating that a data integrity scanner of the vault is not functioning properly; when a report is received from the vault concerning the infected data, checking the report to determine if the report is valid; when the report received from the vault is determined not to be valid, raising an alarm indicating that the data integrity scanner is not functioning properly; and when the report received from the vault is determined to be valid, generating an indication that the data integrity scanner is functioning properly.

Embodiment 2. The method as recited in any preceding embodiment, wherein the infected data is provided to the vault on a randomized basis.

Embodiment 3. The method as recited in any preceding embodiment, wherein the infected data is tagged with a tag indicating a nature of an infection of the infected data.

Embodiment 4. The method as recited in any preceding embodiment, wherein the infected data is associated with an encrypted and signed random number.

Embodiment 5. The method as recited in any preceding embodiment, wherein communications to and from the vault are effected using a visual communication mechanism.

Embodiment 6. The method as recited in any preceding embodiment, wherein the alarm and an associated notification are generated in real-time, and without requiring physical access to the vault, after discovery that the data integrity scanner is not operating properly.

Embodiment 7. The method as recited in any preceding embodiment, wherein communications to and from the vault are effected using a non-network mechanism.

Embodiment 8. The method as recited in any preceding embodiment, wherein the indication that the data integrity scanner is functioning properly is received as a result of successful completion, by the data integrity scanner, of a challenge-response process.

Embodiment 9. The method as recited in any preceding embodiment, wherein the infected data was infected with malware.

Embodiment 10. The method as recited in any preceding embodiment, wherein the infected data is provided to the vault according to a regular cadence.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
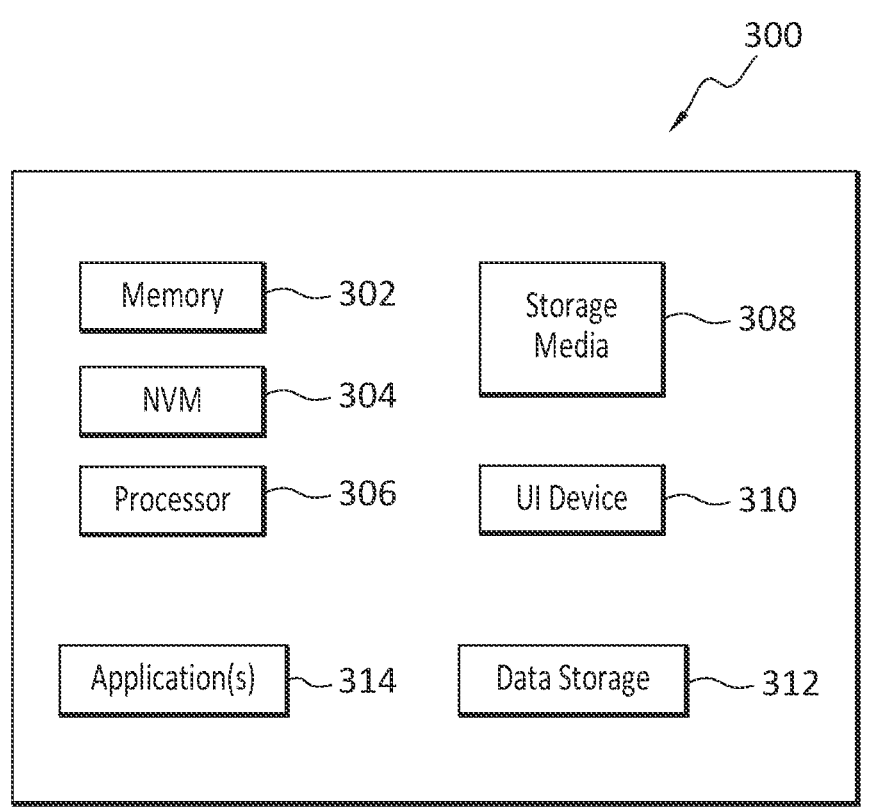
FIG. 3 discloses aspects of a computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
providing infected data to a vault as part of a simulated attack, wherein the infected data comprises a pre-infected backup copy intentionally infected with malware prior to being stored in the vault;
responsive to determining that no report is received, at an expected time, from a data integrity scanner of the vault concerning the infected data in the vault, raising an alarm indicating that the data integrity scanner of the vault is not functioning properly;
responsive to receiving, from the data integrity scanner, a report concerning the infected data, checking the report to determine if the report is valid, wherein checking the report comprises verifying that (i) a nature of infection identified in the report matches a known induced infection and (ii) a cryptographically protected random value associated with the infected data is correctly returned;
responsive to determining that the report is not valid, raising an alarm indicating that the data integrity scanner is not functioning properly; and
responsive to determining that the report is valid, generating an indication that the data integrity scanner is functioning properly, wherein the indication is generated based on successful completion of a challenge-response process by the data integrity scanner.

2. The method as recited in claim 1, wherein the infected data is provided to the vault on a randomized basis.

3. The method as recited in claim 1, wherein the infected data is tagged with a tag indicating a nature of an infection of the infected data.

4. The method as recited in claim 1, wherein the infected data is associated with an encrypted and signed random number.

5. The method as recited in claim 1, wherein communications to and from the vault are effected using a visual communication mechanism.

6. The method as recited in claim 1, wherein the alarm and an associated notification are generated in real-time, and without requiring physical access to the vault, after discovery that the data integrity scanner is not operating properly.

7. The method as recited in claim 1, wherein communications to and from the vault are effected using a non-network mechanism.

8. The method as recited in claim 1, wherein the indication that the data integrity scanner is functioning properly is received as a result of successful completion, by the data integrity scanner, of a challenge-response process.

9. The method as recited in claim 1, wherein the infected data was infected with malware.

10. The method as recited in claim 1, wherein the infected data is provided to the vault according to a regular cadence.

11. A non-transitory storage medium having stored therein instructions that are executable by one or more hardware processors to perform operations comprising:

providing infected data to a vault as part of a simulated attack, wherein the infected data comprises a pre-infected backup copy intentionally infected with malware prior to being stored in the vault;

responsive to determining that no report is received, at an expected time, from a data integrity scanner of the vault concerning the infected data in the vault, raising an alarm indicating that the data integrity scanner of the vault is not functioning properly;

responsive to receiving, from the data integrity scanner, a report concerning the infected data, checking the report to determine if the report is valid, wherein checking the report comprises verifying that (i) a nature of infection identified in the report matches a known induced infection and (ii) a cryptographically protected random value associated with the infected data is correctly returned;

responsive to determining that the report received from the vault is not valid, raising an alarm indicating that the data integrity scanner is not functioning properly; and responsive to determining that the report received from the vault is valid, generating an indication that the data integrity scanner is functioning properly, wherein the indication is generated based on successful completion of a challenge-response process by the data integrity scanner.

12. The non-transitory storage medium as recited in claim 11, wherein the infected data is provided to the vault on a randomized basis.

13. The non-transitory storage medium as recited in claim 11, wherein the infected data is tagged with a tag indicating a nature of an infection of the infected data.

14. The non-transitory storage medium as recited in claim 11, wherein the infected data is associated with an encrypted and signed random number.

15. The non-transitory storage medium as recited in claim 11, wherein communications to and from the vault are effected using a visual communication mechanism.

16. The non-transitory storage medium as recited in claim 11, wherein the alarm and an associated notification are generated in real-time, and without requiring physical access to the vault, after discovery that the data integrity scanner is not operating properly.

17. The non-transitory storage medium as recited in claim 11, wherein communications to and from the vault are effected using a non-network mechanism.

18. The non-transitory storage medium as recited in claim 11, wherein the indication that the data integrity scanner is functioning properly is received as a result of successful completion, by the data integrity scanner, of a challenge-response process.

19. The non-transitory storage medium as recited in claim 11, wherein the infected data was infected with malware.

20. The non-transitory storage medium as recited in claim 11, wherein the infected data is provided to the vault according to a regular cadence.

\* \* \* \* \*